United States Patent
Harima et al.

[11] Patent Number: 5,829,307
[45] Date of Patent: Nov. 3, 1998

[54] INDUSTRIAL ROBOT

[75] Inventors: Taroh Harima; Junji Takehara, both of Tokyo, Japan

[73] Assignee: Mitsubishi Denki Kabushiki Kaisha, Tokyo, Japan

[21] Appl. No.: 723,774

[22] Filed: Sep. 30, 1996

[30] Foreign Application Priority Data

Mar. 29, 1996 [JP] Japan .................................. 8-077430

[51] Int. Cl.$^6$ .............................. B25J 19/00; H02G 11/00
[52] U.S. Cl. ........................ 74/490.02; 414/918; 901/50
[58] Field of Search ........................ 901/28, 50; 414/918; 74/490.02; 248/51

[56] References Cited

U.S. PATENT DOCUMENTS

| | | | |
|---|---|---|---|
| 4,499,341 | 2/1985 | Boyd ................................ | 74/490.02 X |
| 4,793,203 | 12/1988 | Staggl et al. ........................ | 414/718 X |
| 5,115,690 | 5/1992 | Torii et al. ............................ | 74/490.02 |
| 5,375,480 | 12/1994 | Nihei et al. ............................ | 74/490.02 |

FOREIGN PATENT DOCUMENTS

| | | |
|---|---|---|
| 62-79993 | 4/1987 | Japan . |
| 62-181393 | 11/1987 | Japan . |
| 6450711 | 2/1989 | Japan . |
| 3111483 | 11/1991 | Japan . |
| 59894 | 2/1993 | Japan . |
| 7107650 | 4/1995 | Japan . |

*Primary Examiner*—Charles A. Marmor
*Assistant Examiner*—Troy Grabow
*Attorney, Agent, or Firm*—Sughrue, Mion, Zinn, Macpeak & Seas, PLLC

[57] ABSTRACT

An industrial robot allowing one-way assembly, size reduction and long cable life includes a first member; a second member which swivels relative to the first member; a third member which swivels relative to the second member; a first drive unit provided at the first member for swiveling the second member; a second drive unit provided at the second member for swiveling the third member; a cable passing inside of the first and second members for feeding power or a signal to the second drive unit; a first fixing member for fixing a portion of the cable to an end portion of the first or second member; a second fixing member for fixing another portion of the cable to an end portion of the first or second member; and a bent cable provided between the first and second fixing members so as to be bent in a U-shape, the bent cable being provided at either one of the first and second members and arranged at a portion of an output shaft of the first drive unit with a bent portion thereof as one end thereof and with portions fixed to the first and second fixing members as other ends thereof.

12 Claims, 16 Drawing Sheets

INDUSTRIAL ROBOT

BACKGROUND OF THE INVENTION

The present invention relates to an industrial robot, and particularly, to a structure for arranging cables for feeding signals and power.

The industrial robot of this type includes a swivel body and a plurality of robot arms pivoted to the body via joints so as to achieve joint operations. Each joint has a joint drive mechanism including a motor, an encoder, a speed reducer and the like for driving the joint. Further, motor drive power feeding cables for feeding the drive power to the respective joint drive mechanisms and control signal cables for operation control are provided.

A first example of a conventional industrial robot is a robot joint structure using a hollow speed reducer. This is described, for example, in Unexamined Japanese Patent Publication No. 6-143186.

In this first example, as shown in FIG. 14, each of joint structures 100 in the robot is arranged as follows: When a rotation input from a joint drive motor 101 is transmitted via gear mechanisms 102 and 103, a speed reducer 104 decelerates it. At the center of the speed reducer 104, a hollow cylindrical region 105 having a relatively large diameter is ensured. Further, upper and lower regions 105 and 106 relative to a center axis A of the hollow speed reducer 104 include no members or elements so as to ensure those regions are dead spaces. The hollow region and the dead spaces are used as a wiring path for cables 107 so that the cables 107 are arranged to pass along the swivel center line A of the joint.

In this conventional industrial robot, since the cables 107 pass through the hollow cylindrical region 105 and the dead space 106, these cables 107 are not subjected to the influences of rotation of joint elements so that the cables 107 are prevented from being subjected to failure due to damage or breakage caused by loads such as twisting or tension.

As a second example of a industrial robot, FIG. 15 shows a wrist device of an industrial robot described, for example, in an Unexamined Japanese Patent Publication No. 7-52074.

In this second example, a wrist device 108 of the industrial robot includes mutually separated wrist chambers 109 and 110. In the wrist chamber 110, a wrist inner casing 111 is pivotally held. In the wrist chamber 109, a wrist device casing 113 receiving therein a drive motor 112 for the wrist inner casing 111 is provided. The wrist inner casing 111 includes therein another drive motor 114. At one side of the wrist device casing 113 is provided a speed reducer chamber 116 which receives therein a spur gear speed reducing mechanism. Further, a wrist wiring chamber 118 is provided in a symmetrical relationship with the speed reducer chamber 116 with respect to the wrist device casing 113. The wrist wiring chamber 118 is covered by another wiring cover 117 which covers a wiring 119.

In this conventional industrial robot, since the speed reducer chamber 116 and the wrist wiring chamber 118 are separately arranged at symmetrical positions with respect to the wrist device casing 113, maintenance of the wiring 119 contained in the wrist wiring chamber 118 and maintenance of the gear mechanism 120 contained in the speed reducer chamber 116 are simplified due to the separated arrangement.

As a third example of a conventional robot, FIG. 16 shows a swivel wiring base of an industrial robot described, for example, in Unexamined Japanese Patent Publication No. 63-295195.

In this third example, the swivel wiring base of the robot includes a fixed base 124 composed of an upright section 121 and an outer tubular section 123 surrounding the upright section 121 via an information opening tubular space 122, a swivel base 125 rotatably supported at the upper end of the outer tubular section 123 via a bearing 15, a wiring 126 which enters the tubular space 122 of the fixed base 124 from the exterior and is fixed to the swivel base 125 in a helical fashion, and a drive motor 128 which is provided at either the swivel base 125 or the upright section 121 and whose output shaft is coupled to another via a gear mechanism 127. The drive motor 128 rotates the swivel base 125 relative to the fixed base 124.

In this conventional industrial robot, the swivel base 125 swivels by means of the drive motor 128 via the gear mechanism 127. At this time, since the wiring 126 having one end fixed to the fixed base 124 is wound tight and loose around the upright section 121 of the fixed base 124 so as to swivel along with the swivel base 125, the wiring 126 is prevented from being subjected to failure due to damage or breakage caused by loads such as torsion or tension.

In the first example, the hollow speed reducer 104 which can ensure the hollow cylindrical region 105 having a relatively large diameter at the center thereof, is necessary. Further, no members or elements can be arranged at the upper and lower regions 105 and 106 along the center axis. Thus, the mechanism is rendered complicated, and the joint is increased in size due to the structure which includes many dead spaces.

In the second example, the speed reducer 116 and the wrist wiring chamber 118 should be separately arranged at symmetrical positions with respect to the wrist device casing 113 so that the joint structure is elongated in the axial direction of the joint.

Further, since the mechanism elements should be provided at both sides of the joint structure simultaneously, assembly from only one direction is not possible. Thus, the assembling efficiency is poor, and it is difficult to employ automated assembly.

In the third example, the cable 126 is wound around the upright section 121, as a joint shaft, 2 to 5 times. Thus, following the rotation of the joint shaft, the cable 126 is wound tight and loose around the shaft. For example, it is assumed that a diameter of the upright section is 30 cm. It is further assumed that the cable is wound around the upright section 3 times in the clockwise direction and that the swivel base 125 is located at the right-most rotation end of the operation range, that is, the cable is wound most tightly. The operation range of the swivel base is assumed to be 360°. When the swivel base 125 rotates by 360° in the counterclockwise direction by means of the drive motor 128 so as to reach its left-most rotation end, the cable 126 is wound most loosely, two times around the upright section. In this case, assuming that the cable 126 is thin enough to ignore the influence of thickness of the cable, the diameter of a turn of the cable is 45 cm, as given by the equation: 30 cm×(3 turns/2 turns)=45 cm.

Thus, the diameter of the turn of the cable 126 inevitably changes so that it is necessary to provide in the joint structure a ring-shaped space which has an inner diameter equal to or smaller than an inner diameter of the cable when wound most tightly, and an outer diameter equal to or greater than an outer diameter of the cable when wound most loosely. This increases the size of the joint structure. In the foregoing example, it is necessary to provide in the joint structure a ring-shaped space having an inner diameter equal to or smaller than 30 cm and an outer diameter equal to or greater than 45 cm.

The present invention has been made to solve the foregoing problems and has an object to provide an industrial robot which allows unidirectional or one-way assembly, achieves a reduction in size and further ensures a long service life of the cables arranged in the robot.

It is another object of the present invention to provide an industrial robot, wherein, when an arm makes a pivotal motion, the cables can smoothly follow the motion of the arm.

Further, it is another object of the present invention to provide an industrial robot, wherein the cables are not liable to be worn due to pivotal motion of an arm.

Further, it is another object of the present invention to provide an industrial robot, wherein noises in signal lines and power feed lines are not liable to interfere with each other.

Further, it is another object of the present invention to provide an industrial robot, wherein bending of cables is facilitated.

Further, it is another object of the present invention to provide an industrial robot, wherein the number of cable circuits can be increased without increasing the accommodating spaces for the cables.

DESCRIPTION OF THE PREFERRED EMBODIMENTS

Figure 1:
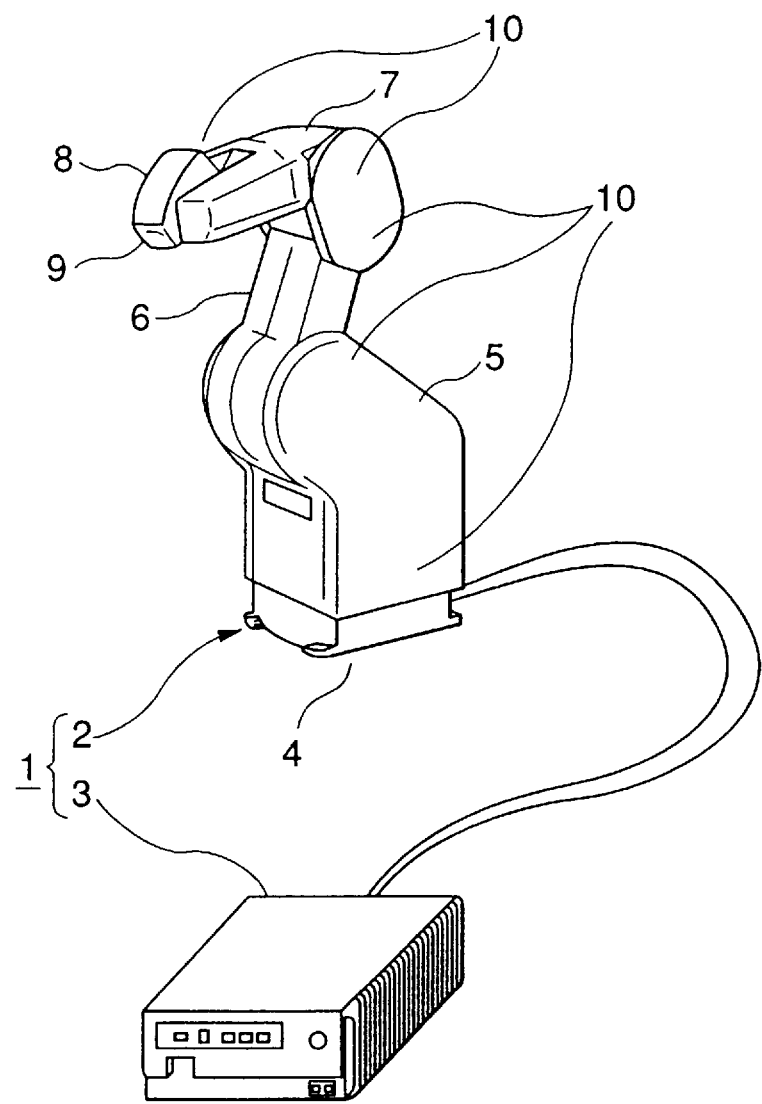
FIG. 1 is a schematic diagram of a system arrangement of an industrial robot according to the present invention.

FIG. 1 shows a system arrangement of an industrial robot according to a first embodiment of the present invention.

FIG. 1 also illustrates a robot system 1 which includes a robot mechanism 2 and a controller 3.

The robot mechanism 2 includes a base 4, a body 5, a first arm 6, a second arm 7, a wrist 8, an end effector 9 and five joints 10 located between the base 4, the first arm 6, the second arm 7 and the wrist 8 and coupling them so that they can swivel (pivot).

The base 4, the body 5, the first arm 6, the second arm 7 and the wrist 8 correspond to first to third members in the present invention, respectively. The correspondence is shown below:

1. first member=base 4, second member=body 5, and third member=first arm 6;
2. first member=body 5, second member=first arm 6, and third member=second arm 7; and
3. first member=first arm 6, second member=second arm 7, and third member=wrist 8.

Figure 3:
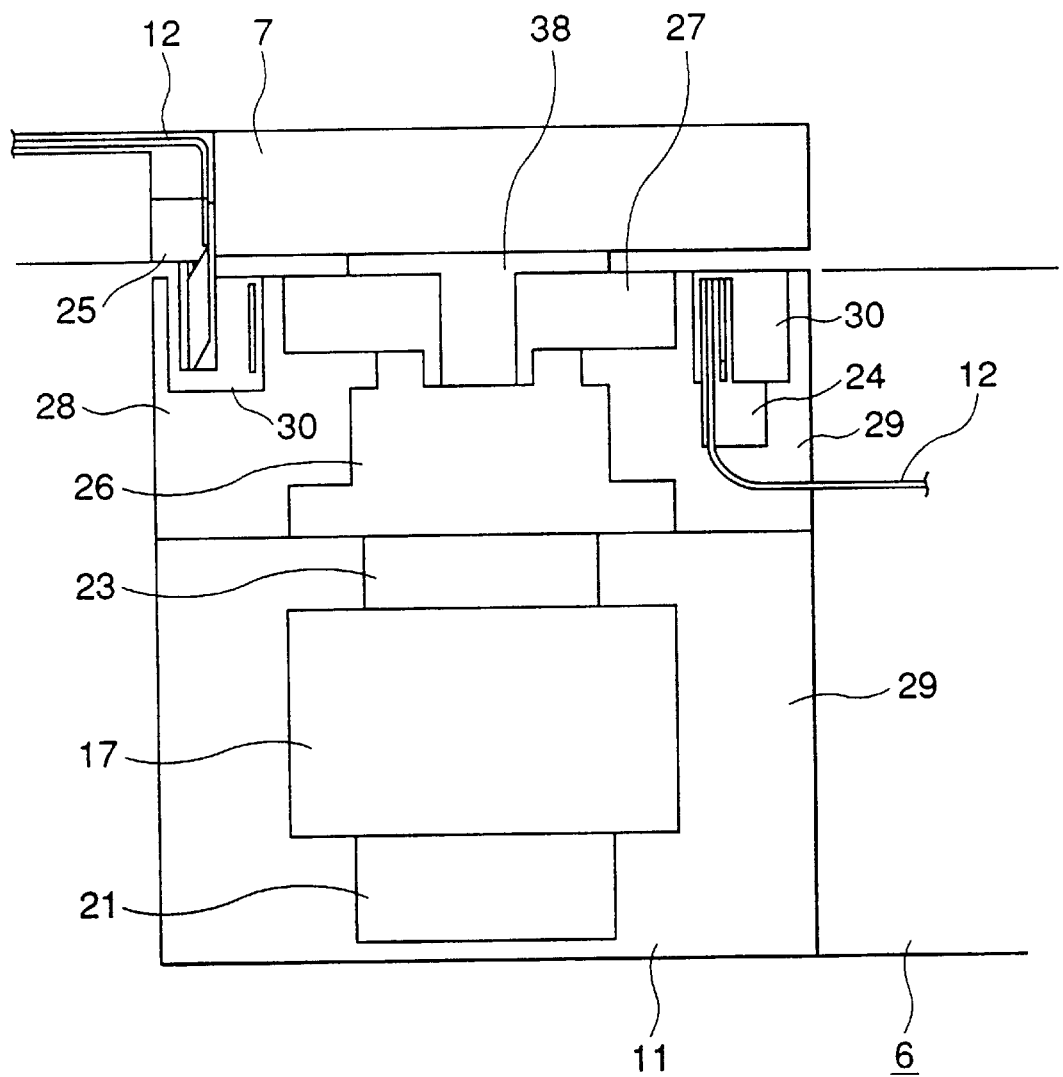
FIG. 3 is a sectional view of a joint of an industrial robot according to the present invention.

As shown in FIG. 3 (which will be explained later in detail), for example, the foregoing joint 10 incorporates therein a drive unit 11, corresponding to a first or second drive unit, for swiveling the body 5, the first arm 6, the second arm 7, the wrist 8 and the end effector 9. The drive unit 11 is fed with drive power from the controller 3, and simultaneously, exchanges drive control signals with the controller 3.

Inside the robot mechanism 2, a flexible card cable 12 for power feed and signal exchange is arranged so as to pass the base 4, the body 5, the first arm 6, the second arm 7, the wrist 8, the end effector 9 and their joints 10.

Figure 2:
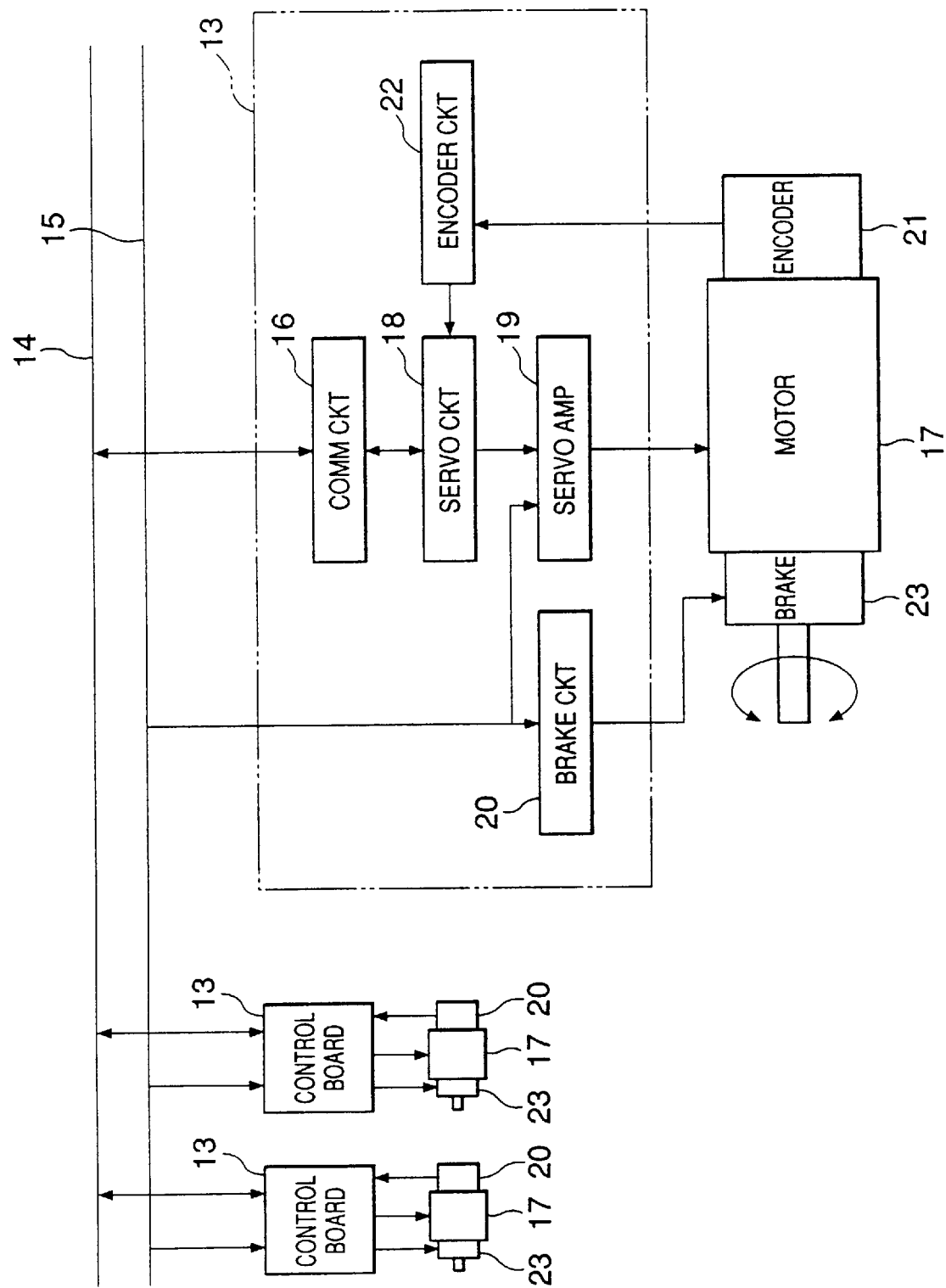
FIG. 2 is a systematic wiring diagram of an industrial robot according to the present invention.

FIG. 2 is a systematic diagram showing the wiring inside the robot mechanism 2.

Each joint 10 is provided with drive unit 11 and a control board 13 for controlling drive unit 11.

The control board 13 is connected to the flexible card cable 12 which includes a power line 14 and a signal line 15 for exchanging signals. The control board 13 includes a communication circuit 16 for exchanging control signals with the controller 3, a servo circuit 18 for driving and controlling the motor 17, a servo amplifier 19 for amplifying a signal from the servo circuit 18, a brake circuit 20, and an encoder circuit 22 for processing a signal from an encoder 21. The communication circuit 16 is connected to the signal line 15 arranged in the robot mechanism 2, while power is fed to the servo amplifier 19 and a brake 23 from the power line 14.

FIG. 3 is a sectional view showing a joint of the industrial robot according to the first embodiment of the present invention.

FIG. 3 illustrates a first arm 6, a second arm 7, a drive unit 11 provided at the first arm 6 for swiveling the second arm 7 relative to the first arm 6, a flexible card cable 12, in the form of a flat tape, including a power line 14 for feeding power and a signal line 15 for exchanging signals, a fixing member 24 for fixing one end (the inner side in FIG. 6) of the flexible card cable 12 to the first arm 6, a fixing member 25 for fixing the other end (the outer side in FIG. 6) of the flexible card cable 12 to the second arm 7, a motor 17, a speed reducer 26, a brake 23, an encoder 21, a bearing 27, and a drive unit casing 28 which holds therein the motor 17.

The encoder 21 is coupled to a shaft of the motor 17. The brake 23 is coupled to the other end of the shaft of the motor 17, and the speed reducer 26 is coupled to an output shaft of the brake 23. The bearing 27 supports an output shaft of the speed reducer 26 and is coupled to the first arm 6. A machine chamber 29 accommodates the motor 17, the speed reducer 26, the encoder 14, etc., while a wiring chamber 30 accommodates the flexible card cable 12 and other elements.

Figure 4:
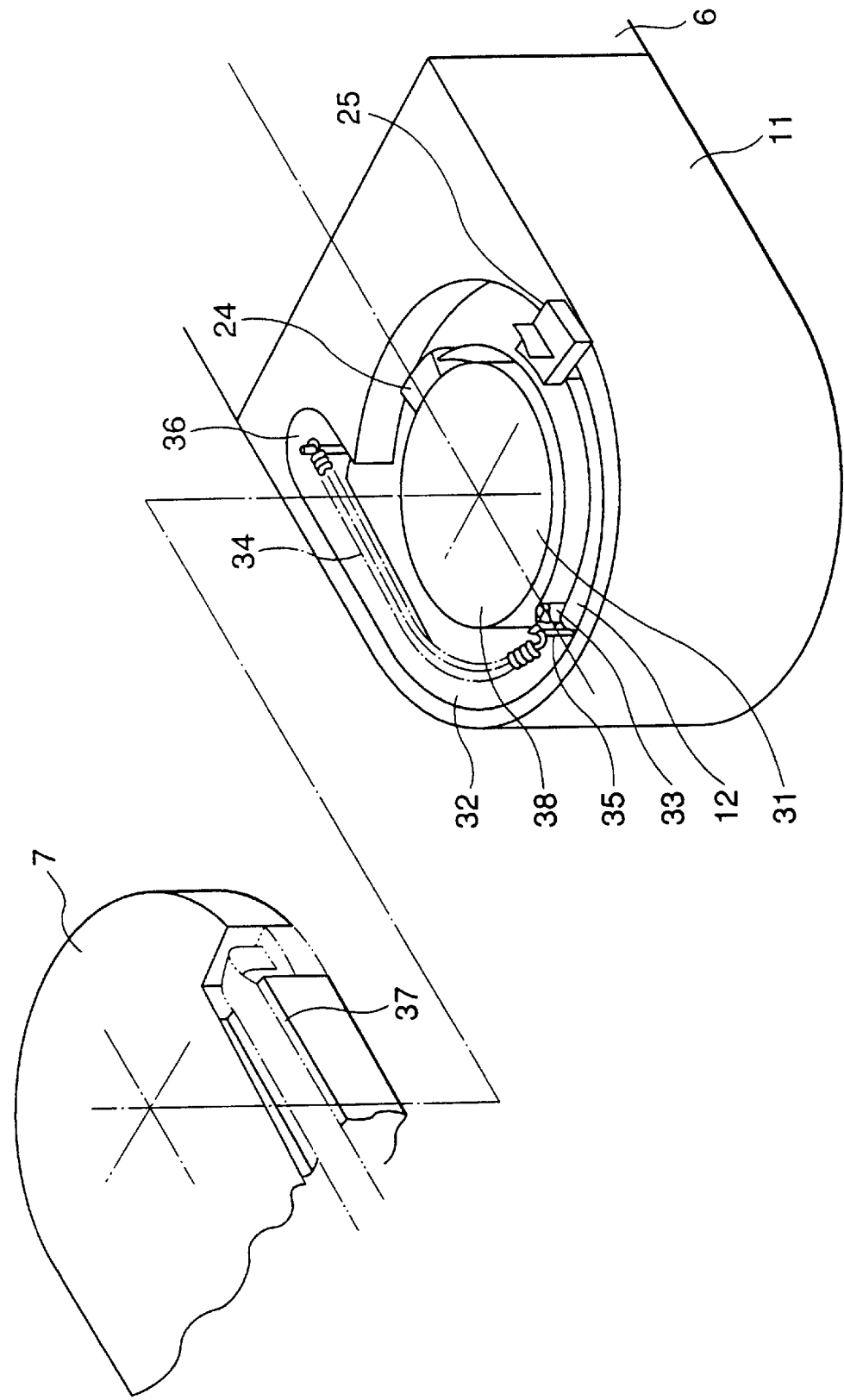
FIG. 4 is a perspective view of a joint of an industrial robot according to a first embodiment of the present invention.

FIG. 4 is a perspective view of the joint.

FIG. 4 illustrates an output flange 31 of the drive unit 11 driving the second arm 7, a ring-shaped groove 32 (ring-shaped space) coaxially formed on the upper side of the drive unit 11 with a shaft (output flange) 38 of the drive unit 11, a cable tension shaft 33 for bending the flexible card cable 12 into a U-shape in the ring-shaped groove 32 (when disposed, bent into a U-shape, in the groove 32, the flexible card cable 12 has an inner-side end fixed to the first arm 6 by means of the cable fixing member 24 and an outer-side end fixed to the second arm 7 by means of the cable fixing member 25) and drawing a bent portion thereof along the groove in a direction opposite to the fixed ends, a spring 34 having one end fixed to one end of the groove 32, a coupling member 35 for coupling the cable tension shaft 33 and the spring 34, a first groove 36 which is attached with the ring-shaped groove 32, having its center located in a tangential direction relative to a ring of the ring-shaped groove 32 and receiving therein a portion of the spring 34, and a second groove 37 formed on the second arm 7 for receiving therein a portion of the flexible card cable 12 drawn out to the second arm 7 from the ring-shaped groove 32.

Figure 5:
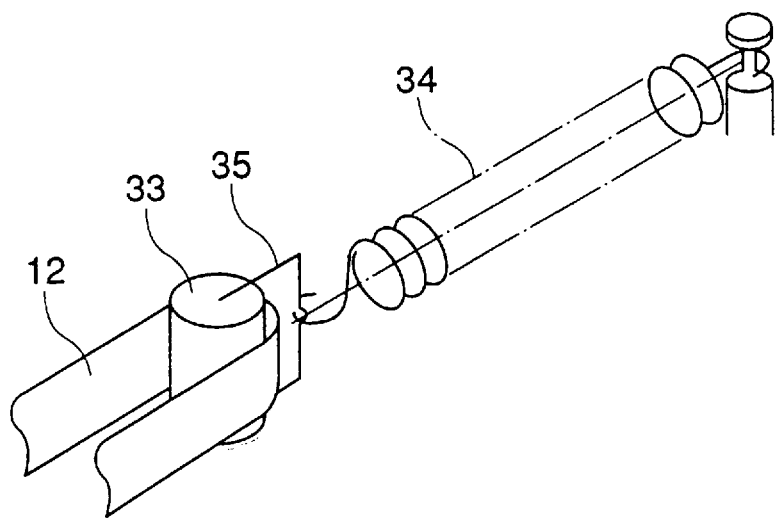
FIG. 5 a perspective view of a tensile mechanism of a bent cable according to the first embodiment of the present invention.

FIG. 5 is an enlarged diagram of the bent portion of the flexible card cable 12 explaining how to impose a tensile force on the flexible card cable 12.

The flexible card cable 12 is bent in a U-shape, and the cable tension shaft 33 is placed at this bent portion. The flexible card cable 12 is coupled to the spring 34 via the cable tension shaft 33 and the spring coupling member 35. By means of the spring 34, the flexible card cable 12 receives a tensile force along the groove 32 shown in FIG. 4.

Figure 6:
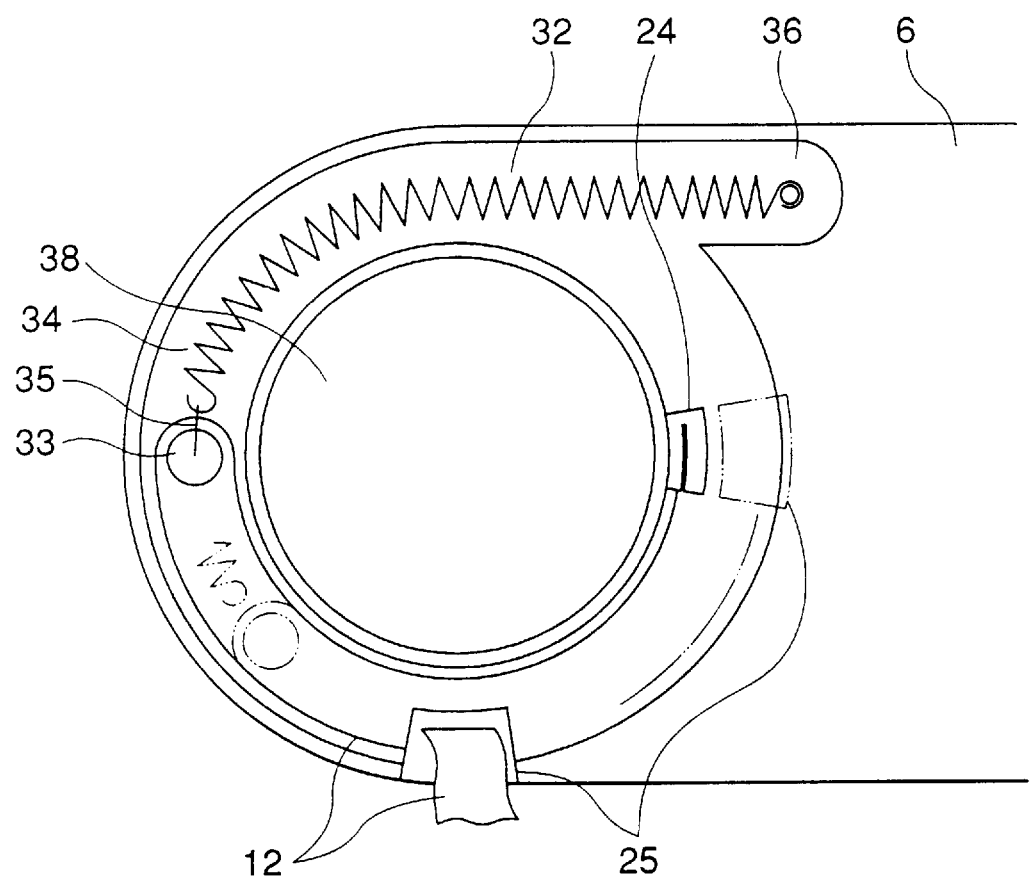
FIG. 6 is a diagram explaining the operation of a bent cable according to first embodiment of the present invention.

In the joint of the robot, when the second arm 7 is aligned with the first arm 6, the cable fixing member 25 is located at a position identified by the solid line shown in FIG. 6. When the second arm 7 swivels by 90° in the counterclockwise direction by means of the drive unit 11, the cable fixing member 25 fixed to the second arm 7 moves to a position identified by a two-dot chain line. At this time, although the outer edge of the flexible card cable 12 connected to the cable fixing member 25 can be drawn out by a length corresponding to a moved distance of the cable fixing member 25, since tensile force is applied by the spring 34 via the cable tension shaft 33, the drawn-out portion of the flexible card cable 12 is pulled by the cable tension shaft 33. Thus, the flexible card cable 12 moves by 45° in the counterclockwise direction from the bent portion identified by the solid line to the bent portion identified by the two-dot chain line without generating corrugation between the cable fixing member 24 and the cable tension shaft 33 or between the cable tension shaft 33 and the cable fixing member 25 due to loosening. Accordingly, the U-shape formed by the cable fixing member 24, the cable tension shaft 33, and the cable fixing member 25 is kept so as to follow the movement of the cable fixing member 25 caused by the pivotal motion of the second arm.

Further, since the inner-side end of the flexible card cable 12 pressed against an inner-wall outer periphery of the ring-shaped space 32 due to a component, in a direction of the diameter of the ring-shaped space 32, of the tensile force applied by the spring 34 via the cable tension shaft 33 is fixed to the fixed (not movable) cable fixing member 24, no relative motion is generated between a wall surface of the drive unit 11, forming the ring-shaped space 32, at the side of the cable fixing member 24 (hereinafter, this wall surface will be referred to as "inner-wall outer periphery") and the flexible card cable 12 at the side of the cable fixing member 24 (hereinafter referred to as "the inner-side of flexible card cable 12") regardless of the operation of the second arm 7. Thus, friction which prevents the movement of the flexible card cable 12 is not generated between the inner-wall outer periphery of the ring-shaped space 32 and the inner-side of flexible card cable 12. On the other hand, since a component force of the spring 34 in the diametrical direction applied to the flexible card cable 12 at the side of the cable fixing member 25 (hereinafter referred to as "the outer-side of flexible card cable 12") is oriented inward, the outer-side of flexible card cable 12 is not pressed against an outer-wall inner periphery of the ring-shaped space 32 as opposed to the inner-side of flexible card cable 12. Accordingly, the outer-side of flexible card cable 12 and the outer-wall inner periphery of the ring-shaped space 32 are not liable to abut each other, and thus, even if abutted, friction therebetween is small so that movement of the flexible card cable 12 is not prevented.

Specifically, if the cable fixing member 25 is a fixed type and the cable fixing member 24 is a movable type, relative motion is generated between the inner-wall outer periphery of the ring-shaped space 32 and the inner-side of flexible card cable 12. Accordingly, the tensile force applied to the inner-side flexible card cable 12 by the spring 34 via the cable tension shaft 33 works to press it against the inner-wall outer periphery of the ring-shaped space 32 due to its component force in the diametrical direction of the ring-shaped space 32 so that friction generated between the inner-wall outer periphery of the ring-shaped space 32 and the inner-side flexible card cable 12 prevents the movement of the flexible card cable 12. This may cause the occurrence of corrugation of the flexible card cable 12 and further cause jamming of the flexible card cable 12 in the ring-shaped space 32. Thus, the smooth movement of the robot arm may be prevented, or a failure such as disconnection may occur due to excessive force applied to the flexible card cable 12.

Further, since the flexible card cable 12 is arranged in the U-shape by means of the cable fixing member 24, the cable tension shaft 33, and the cable fixing member 25, the distance of movement of the cable tension shaft 33 at the bent portion of the flexible card cable 12 is half the distance of movement of the cable fixing member 25 caused by the pivotal motion of the second arm 7.

In the foregoing, the second arm 7 swivels in the counterclockwise direction. If the second arm 7 swivels in the clockwise direction by means of the drive unit 11, the same effect can be achieved. In this case, since the flexible card cable 12 is given a tensile force at the bent portion by the spring 34 via the cable tension shaft 33, the movement of the fixing member 25 due to the pivotal motion of the second arm can be followed without losing the U-shape formed by the cable fixing member 24, the cable tension shaft 33 and the cable fixing member 25.

According to the foregoing structure, since all of the wiring elements, such as the flexible card cable 12, are received in the ring-shaped space 32, it is not necessary to provide the wiring chamber 30 including these members and elements in the region along the shaft as in the foregoing first example. Thus, the wiring chamber 30 can be provided at the end of the arm at the side of the output flange 38. With this arrangement, one-way assembly in a direction from the output flange tip is rendered possible so that the assembly process is improved and thus automated assembly is facilitated.

Further, the ring-shaped space 32 for accommodating the flexible card cable 12 in the wiring chamber 30 can be arranged concentrically on the outer side of the drive unit 11 so that the wiring chamber 30 itself can be reduced in size in the axial direction.

Further, since the flexible card cable 12 is given a tensile force by the spring 34 via the cable tension shaft 33, if the second arm 7 swivels in the clockwise or counterclockwise direction, the flexible card cable 12 follows the pivotal motion of the second arm without generating corrugation due to loosening.

Since the flexible card cable 12 is not wound tight or loose by the movement of the second arm 7, the diameter of a turn of the flexible card cable 12 is held constant. Accordingly, it is sufficient to set the width of the ring-shaped space 32 of the wiring chamber 18 for receiving the flexible card cable 12 to be only twice the thickness of the cable tension shaft 33 and the flexible card cable 12 so that the wiring chamber 18 can be reduced in size.

Further, since the flexible card cable 12 is arranged in the U-shape in the ring-shaped space 32 of the wiring chamber 18, the operation angle of the cable tension shaft 33 at the bent portion is half the operation angle of the second arm 7 so that the extending/retracting range of the tensile force spring 34 can be reduced. Accordingly, the spring 34 can be shortened, and thus, the groove 36 for receiving therein the spring 34 can be shortened to reduce the size of the joint.

Also, since the power line 14 and the signal line 15 are realized in the form of the flexible card cable 12 of a flat-tape shape, the width of the ring-shaped space 32 of the wiring chamber 18 can be reduced, and thus, the wiring chamber 18 can be reduced in size, as compared with the general cable having a circular cross-section employed in the foregoing examples.

Further, since the bent portion of the U-shaped flexible card cable 12 moves on the cable, portions where the bending stress is concentrated are dispersed so that the accumulated stress due to the bending at the respective portion of the flexible card cable 12 can be reduced to prolong the life of the flexible card cable 12.

Further, since the flexible card cable 12 is free of torsion loading, stress is not concentrated on the cables of the flexible card cable 12 at its fringe while the stress due to the bending load is uniformly applied to all the cables. Thus, the life of the flexible card cable 12 can be prolonged as compared with the case where the torsion load is applied.

Figure 7:
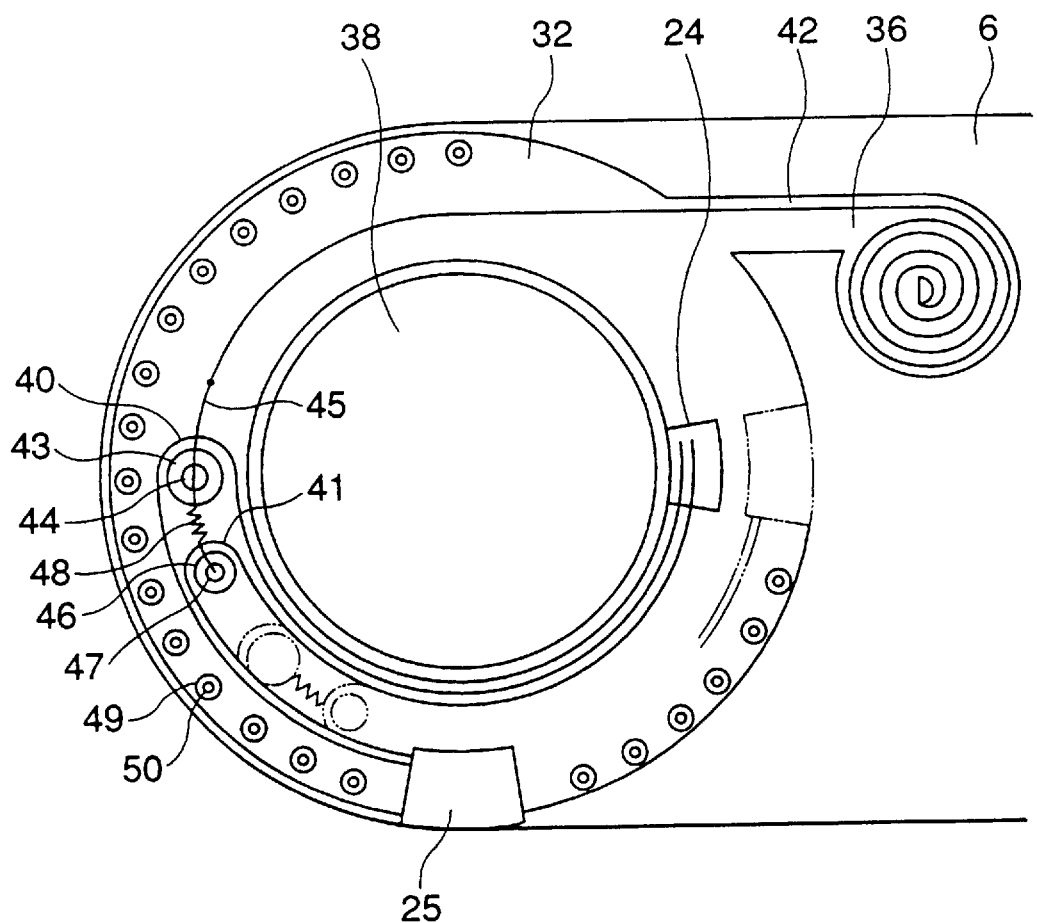
FIG. 7 is a diagram for explaining an operation of a bent cable according to a second embodiment of the present invention.

FIG. 7 is a plan view of an end portion of the first arm 6 at the side of the drive unit according to a second embodiment of the present invention (corresponding to FIG. 6 of the first embodiment).

In the second embodiment, those portions corresponding to the flexible card cable 12, the spring 34, the cable tension shaft 33 and the spring coupling member 35 in the first embodiment particularly differ.

FIG. 7 illustrates an outer-side flexible card cable 40 including a power line 14, and an inner-side flexible card cable 41 including a signal line 15. These flexible card cables 40 and 41 are bent into a U-shape, respectively, overlapped with each other, and accommodated in the groove 32.

In the first embodiment, the signal line 15 and the power line 14 are included in one flexible card cable. On the other hand, the present mode, the signal line and the power line are arranged in the separate flexible card cables 40 and 41. In a case where the power to be supplied is large, wiring with a large sectional area is required. In a case where the number of signal lines to be disposed is large, width of the flexible card cable is increased. Therefore, it is necessary to arrange the plural flexible card cables in this mode.

The number of the flexible electric-card cables is not limited to two, but may be equal to or greater than three.

FIG. 7 also illustrates a constant tensile force spring 42 for pulling the flexible electric-card cables 40 and 41, an outer-side cable tension roller which rolls along with the movement of a bent portion of the U-shaped outer-side flexible electric-card cable 40 which follows the movement of the cable fixing member 25 due to the pivotal motion of the second arm 7, an outer-side cable tension roller shaft 44 passing through the core of the outer-side cable tension roller 43, a coupling member 45 for coupling between the outer-side cable tension roller shaft 44 and the constant tensile force spring 42, an inner-side cable tension roller 46 which, like the outer-side cable tension roller 43, rolls along with the movement of a bent portion of the U-shaped inner-side flexible electric-card cable 41, an inner-side cable tension roller shaft 47 passing through the core of the inner-side cable tension roller 46, and springs 48 for coupling between the outer-side cable tension roller shaft 44 and the inner-side cable tension roller shaft 47 and pulling the bent portion of the U-shaped inner-side flexible card cable 41.

In this mode, as shown in FIG. 7, the outer-side flexible card cable 40 is for the power lines, while the inner-side flexible card cable 41 is for the signal lines. By setting the inner-side flexible card cable 41 to be somewhat shorter than the outer-side flexible card cable 40, the positions of the bent portions of the inner-side and outer-side flexible card cables 41 and 40 can be arranged to differ from each other. This arrangement prevents the outer-side and inner-side cable tension rollers 43 and 46 from interfering with each other.

Cable guide rollers 49 are arranged such that the rollers are located along and inside the inner periphery of the groove receiving therein the flexible card cables 40 and 41.

Figure 8:
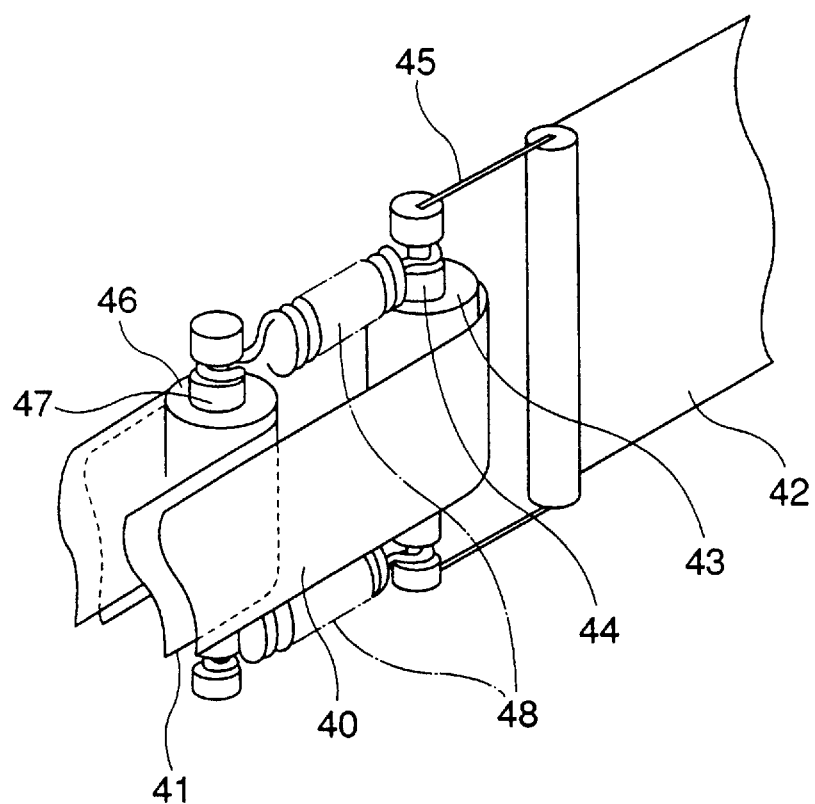
FIG. 8 is a perspective view of a tensile mechanism of a bent cable according to the second embodiment of the present invention.

FIG. 8 is an enlarged view of the bent portions of the U-shaped flexible card cables 40 and 41 where the card cables 40 and 41 are pulled, according to the second embodiment of the present invention.

The outer-side flexible card cable 40 is bent into a U-shape. At this bent portion, the outer-side cable tension roller 43 with the outer-side cable tension roller shaft 44 passing therethrough is slidably provided, and connected to the constant tensile force spring 42 via the coupling member 45. By means of spring 42, the outer-side flexible electric card cable 40 is pulled. Further, at the bent portion of the U-shaped inner-side flexible electric-card cable 41, the inner-side cable tension roller 46 with the inner-side cable tension roller shaft 47 passing therethrough is slidably provided. The outer-side cable tension roller 43 and the inner-side cable tension roller 46 are coupled with each other via the springs 48 so that the bent portion of the U-shaped inner-side flexible electric-card cable 41 is pulled by the constant tensile force spring 42 via the springs 48.

Figure 9:
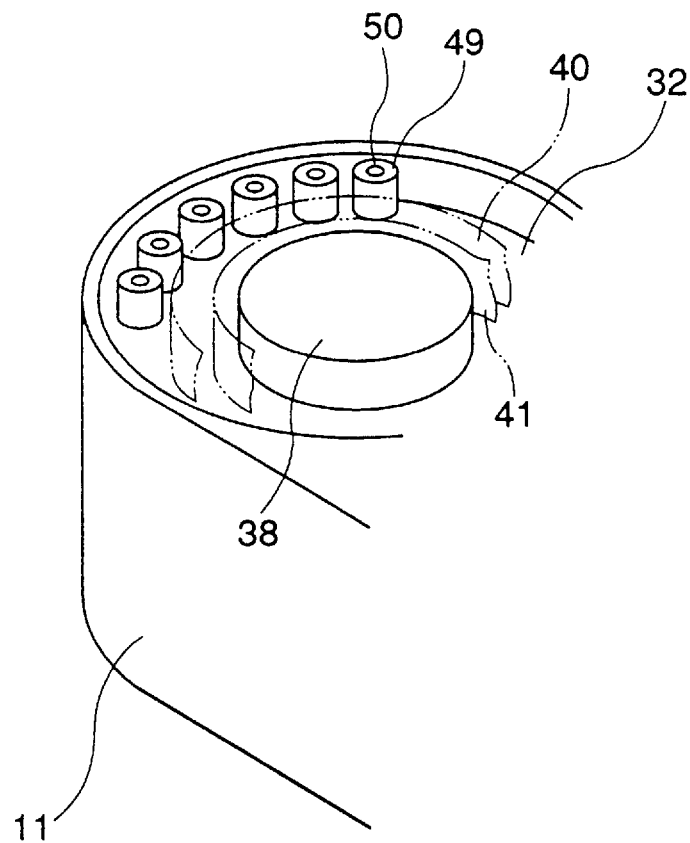
FIG. 9 is a perspective view of a low-friction portion according to the second embodiment of the present invention.

FIG. 9 is a partial enlarged view showing the groove 32 and the cable guide rollers 49 arranged along the inner periphery of the outer wall of the groove 32.

Even if the card cables 40 and 41 which follow the movement of the cable fixing member 25 caused by the pivotal motion of the second arm 7 swell out in a radial direction of the pivotal motion of the second arm 7, the card cables 40 and 41 abut the cable guide rollers 49 which then rotate so as to match the movement of the card cables 40 and 41.

In the second embodiment, as in the first embodiment, since the inner-side ends of the card cables 40 and 41 which are pressed against the inner-wall outer periphery of the ring-shaped space 32 are fixed to the cable fixing member 24, no relative motion is generated, regardless of the operation of the second arm 7, between the inner-wall outer periphery of the ring-shaped space and the inner sides of the card cables 40 and 41 due to the component of the tensile force in the diametrical direction of the ring-shaped space 32. (The tensile force is applied by the constant tensile force spring 19 via the cable tension rollers 43 and 46 and the cable tension roller shafts 44 and 47). Thus, friction which might prevent the movement of the card cables 40 and 41 is not generated between the inner-wall outer periphery of the ring-shaped space and the inner sides of the card cables 40 and 41.

Figure 10:
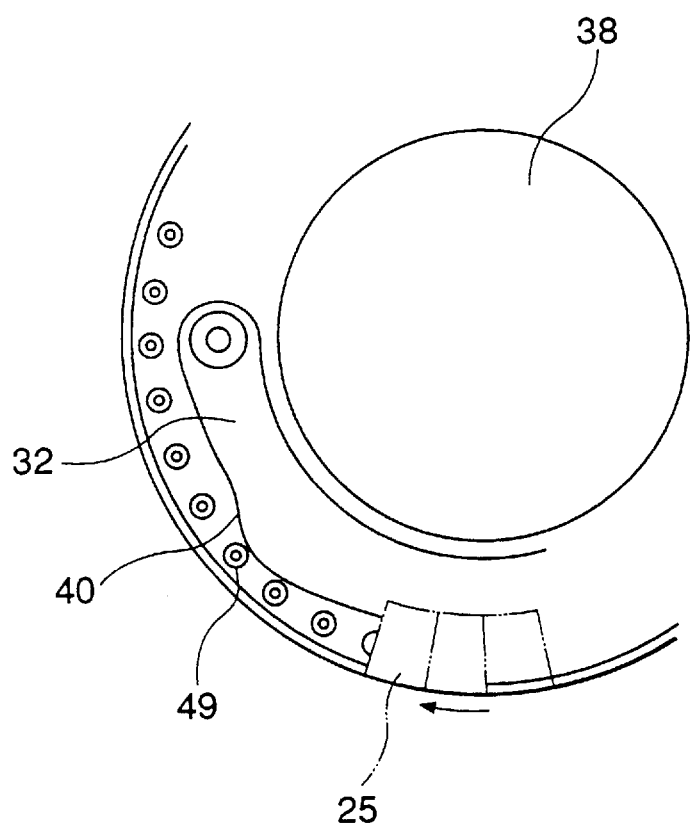
FIG. 10 is a diagram explaining the operation of a low-friction portion according to the second embodiment of the present invention.

Further, in the second embodiment, since the cable guide rollers 49 are provided, even when rapid pivotal motion of the second arm 7 in the clockwise direction is generated by means of the drive unit 11 as shown in FIG. 10, the constant tensile force spring 42 can follow the movement of the cable fixing member 25 caused by the pivotal motion of the second arm 7. Specifically, even when the card cables 40 and 41 temporarily swell out in the radial direction of the pivotal motion of the second arm 7, the card cables 40 and 41 abut the slidable cable guide rollers 49. Since the roller 49 rotates so as to match the movement of the card cables 40 and 41, the card cables 40 and 41 are prevented from being caught.

Instead of the cable guide rollers 49, a low-friction film made of Teflon or the like may be attached to or formed on the inner periphery of the outer wall of the groove to achieve a similar effect.

According to the foregoing structure, since the tensile force applied to the outer-side card cable 40 by means of the constant tensile force spring 42 is constant regardless of the position of the second arm 7, the ability of the inner-side card cable 41 to follow is also constant irrespective of the second arm 7.

Specifically, due to the tensile force of the springs 48, the inner-side card cable 41 is pulled via the cable tension roller 46 and the cable tension roller shaft 47. Thus, without destroying the U-shape formed by the cable fixing members 24 and 25 and the cable tension roller 46 and without generating corrugation due to loosening even when the second arm 7 swivels in the clockwise or counterclockwise direction, the inner-side card cable 41 can follow the movement of the cable fixing member 25 following the pivotal motion of the second arm 7.

Further, by means of the resilience of the spring 48, no delicate distance adjustment between the cable tension roller shafts 44 and 47 is necessary so that assembly operations and maintenance/examination can be facilitated.

Further, by separating the power line 14 and the signal line 15 into the respective card cables 40 and 41, the influence caused by noises from the mutual lines can be reduced.

Further, in the second embodiment, the card cables 40 and 41 are overlapped twofold. However, the flexible electric-card cables may be overlapped threefold or more so as to easily increase the number of cables and thus the number of circuits.

Further, since the signal line 15 is arranged in the inner-side card cable 41 while the power line 14 is arranged in the outer-side card cable 40, the width of each of the card cables can be reduced so that the depth of the groove 32 of the wiring chamber 30 can be diminished to reduce the thickness of the wiring chamber 30, thereby leading to a reduction in size of the joint 10.

Further, since the cable tension rollers 43 and 46 roll on the inner surfaces of the bent portions of the U-shaped card cables 40 and 41 in synchronism with the movement of the bent portions of the card cables 40 and 41, the abrasion of films on the inner surfaces of the bent portions can be prevented, which would otherwise be caused by the friction generated upon advancing and retreating motions of the card cables 40 and 41.

Even when the outer-side card cable 40, which follows the movement of the cable fixing member 25 caused by the pivotal motion of the second arm 7, swells out in the radial direction of the pivotal motion of the second arm 7, the outer-side card cable 40 abuts the cable guide rollers 23 which then rotate so as to match the movement of the outer-side card cable 40. Thus, the abrasion of the cables due to friction with the outer-wall inner periphery of the groove 9 can be prevented.

Figure 11:
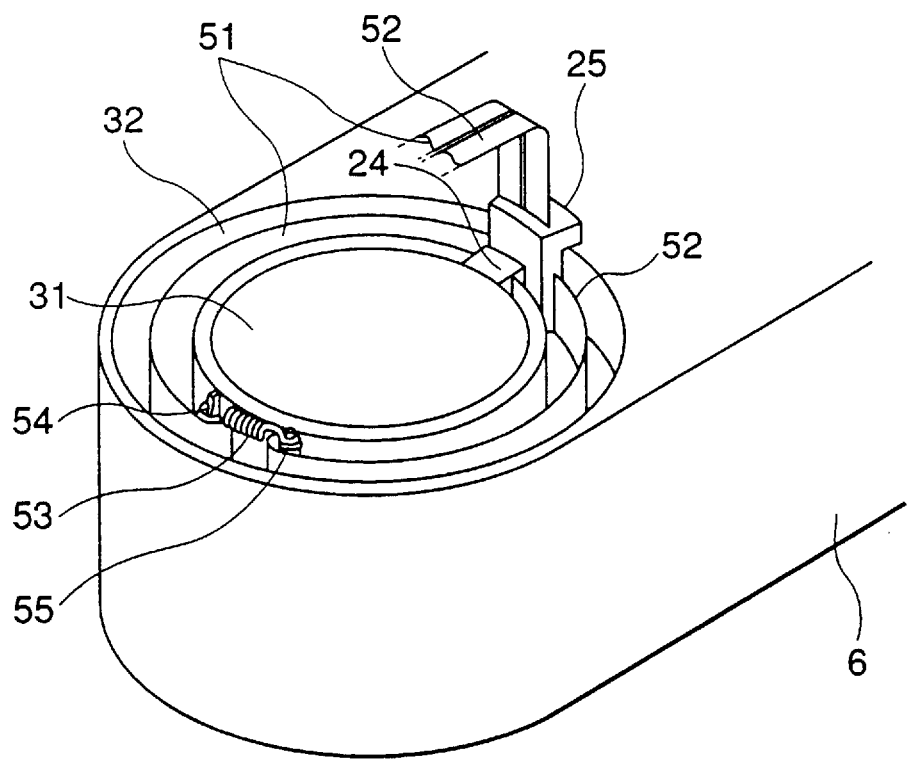
FIG. 11 is a perspective view of a joint of an industrial robot according to a third embodiment of the present invention.

FIG. 11 is a perspective view showing a joint according to the third mode of the present invention.

In FIG. 11, which corresponds to FIG. 4 of the first embodiment, flexible card cables 51 and 52, spring 53, cable tension shafts 54 and 55, and coupling members 56 and 57 for coupling between the cable tension shafts 54 and 55 and the spring 53 differ from those in the first embodiment.

FIG. 11 illustrates a flexible card cable 51 including the power line 14, and a flexible card cable 52 including the signal line 15. The card cables 51 and 52 are arranged in the groove 32 such that their bent portions confront each other. Additionally, FIG. 11 shows a cable coupling spring 53 for coupling between the card cables 51 and 52.

Cable tension rollers 54, and 55, respectively, rotate along with the movement of the bent portions of the U-shaped card cables 51 and 52 following the movement of the cable fixing member 25 caused by the pivotal motion of the second arm 7. The roller 54 is provided at the side of the power card cable 51, while the roller 55 is provided at the side of the signal card cable 52. Still further, FIG. 11 shows cable tension roller shafts 56 and 57, respectively, passing through the cores of the corresponding cable tension rollers 54 and 55.

In a third embodiment, as in the second embodiment, the signal lines and the power lines are arranged in separated card cables 51 and 52 so as to reduce the height of the card cable.

Further, where either the power to be supplied is large (requiring wiring with a large sectional area) and the number of signal lines is large (increasing the width of the card cable), it is necessary to arrange plural flexible card cables in this embodiment.

In the third embodiment, the number of card cables illustrated is two, but may be three or more. In this case, the signal card cables and/or the power card cables may be arranged twofold on the outer and inner sides.

Since the inner-side ends of the card cables 51 and 52 (which are pressed against the inner-wall outer periphery of the ring-shaped space 32 due to the component, in the diametrical direction of the ring-shaped space 32, of the tensile force applied by the cable coupling spring 25 via the cable tension rollers 54 and 55 and the cable tension roller shafts 56 and 57) are fixed to the cable fixing member 24, no relative motion is generated, regardless of the operation of the second arm 7, between the inner-wall outer periphery of the ring-shaped space and the inner sides of the card cables 51 and 52.

Thus, any friction which is generated between the inner-wall outer periphery of the ring-shaped space 32 and the inner sides of the card cables 51 and 52 does not prevent the movement of the card cables 51 and 52.

Figure 12:
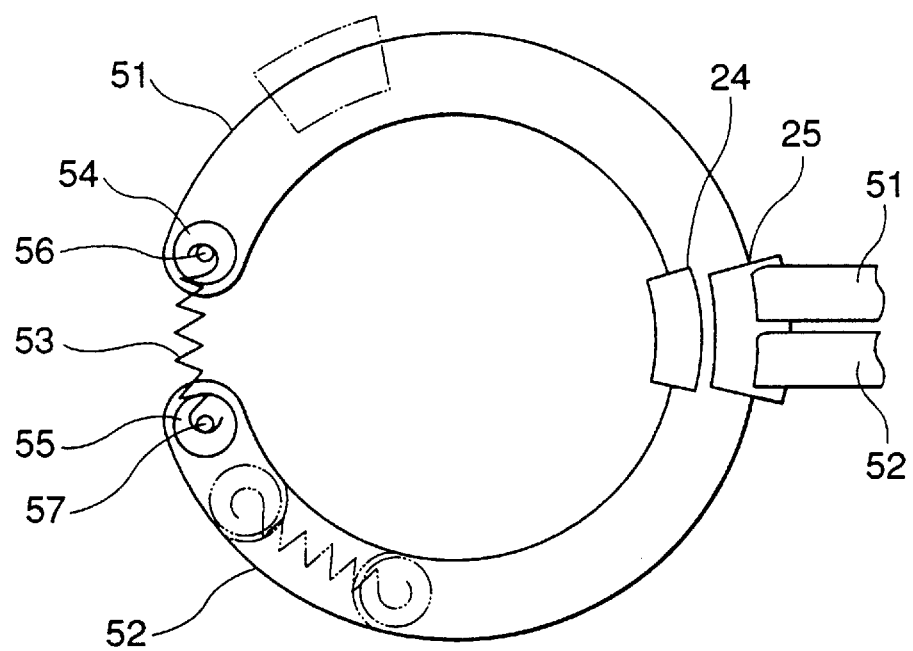
FIG. 12 is a front view of a joint of an industrial robot according to the third embodiment of the present invention.

In the robot joint, when the second arm 7 is aligned with the first arm 6, the cable fixing member 25 is located at a position identified by the solid line as shown in FIG. 12.

When the second arm 7 swivels by 110° in the counterclockwise direction by means of the drive unit 11, the cable fixing member 25 fixed to the second arm 7 moves to a position identified by a two-dot chain line. At this time, the card cables 51 and 52 are pulled by the second arm 7 so as to move, along with the rollers 54 and 55 and the roller shafts 56 and 57, by 55° from the bent positions identified by solid lines in the counterclockwise direction to reach positions identified by the two-dot chain lines.

On the other hand, since the card cables 51 and 52 are via the roller shafts 56 and 57, the cable coupling spring 53 and the rollers 54 and 55, the card cables 51 and 52 move by 55° in the counterclockwise direction from the bent positions identified by solid lines to the positions identified by the two-dot chain lines without generating corrugation due to loosening between the cable fixing member 24 and the rollers 54 and 55 or between the rollers 54 and 55 and the cable fixing member 25. Thus, the card cables can follow the movement of the cable fixing member 25 due to the pivotal motion of the second arm 7 without losing the U-shapes formed by the cable fixing member 24, the cable tension rollers 54 and 55 and the cable fixing member 25.

At this time, since the card cable 51 is arranged in the U-shape defined by the cable fixing member 24, the cable tension roller 54 and the cable fixing member 25, the distance of movement of the cable tension roller 54 at the bent portion of the flexible card cable 51 is half that of the cable fixing member 25 caused by the pivotal motion of the second arm 7.

Similarly, since the card cable 52 is arranged in the U-shape defined by the cable fixing member 24, the cable tension roller 55 and the cable fixing member 25, the distance of movement of the cable tension roller 55 at the bent portion of the flexible card cable 52 is half that of the cable fixing member 25 caused by the pivotal motion of the second arm 7.

In this manner, the confronting card cables 51 and 52, and the cable tension rollers 54 and 55, the cable tension roller shafts 56 and 57 and the cable coupling spring 53 constituting the confronting portions, cooperatively move a distance which is half the distance of movement of the cable fixing member 25 caused by the pivotal motion of the second arm 7.

According to the foregoing structure, by arranging the card cables 51 and 52 in a confronting relationship, springs 34 and 42 of long strokes (as shown in the modes 1 and 2) are not necessary. This makes it possible to use the space corresponding to the strokes of the springs as an operating area of the card cables. Since the spring 34 and the constant tensile force spring 42 and, further, the installation space therefor can be omitted, the reduction in number of parts and the effective use of the space can be achieved.

Following this, the groove 32 can be of a simple ring shape, and further, the number of parts can be reduced. This improves the assembly of the unit as well as the maintenance thereof.

Further, since the power card cable 51 and the signal card cable 52 are not arranged adjacent to each other as in the second embodiment, but arranged separately, the influence of noise from each other can be further reduced.

Further, since the card cables 51 and 52 are pulled by means of the tensile force of the cable coupling spring 53 via the cable tension rollers 54 and 55 and the cable tension roller shafts 56 and 57, the card cables 51 and 52 can follow the movement of the cable fixing member 25 following the pivotal motion of the second arm 7 without losing the U-shapes defined by the cable fixing member 24, the cable tension rollers 54 and 55 and the cable fixing member 25 and without generating corrugations due to loosening when the second arm 7 swivels in the clockwise or counterclockwise direction.

Further, owing to the cable coupling spring 53, no delicate distance adjustment between the cable tension roller shafts 56 and 57 is necessary so that assembly and maintenance/examination can be facilitated.

Further, since the confronting card cables 51 and 52, and the cable tension rollers 54 and 55, the cable tension roller shafts 56 and 57 and the cable coupling spring 53 constituting the confronting portion, cooperatively follow the movement of the cable fixing member 25 caused by the pivotal motion of the second arm 7, the length of the cable coupling spring 53 is approximately constant.

Thus, the tensile force applied to the card cables 51 and 52 is approximately constant so as to prevent the card cables 51 and 52 from being subjected to local generation of large bending stress. In the first embodiment, since the tensile force varies depending on the position of the cable fixing member 25, the card cable is subjected to tensile force which is greater than the minimum as required. On the other hand, in the third embodiment, the card cables 51 and 52 are subjected to only the minimum tensile force, the life of the card cables 51 and 52 can be prolonged.

Figure 13:
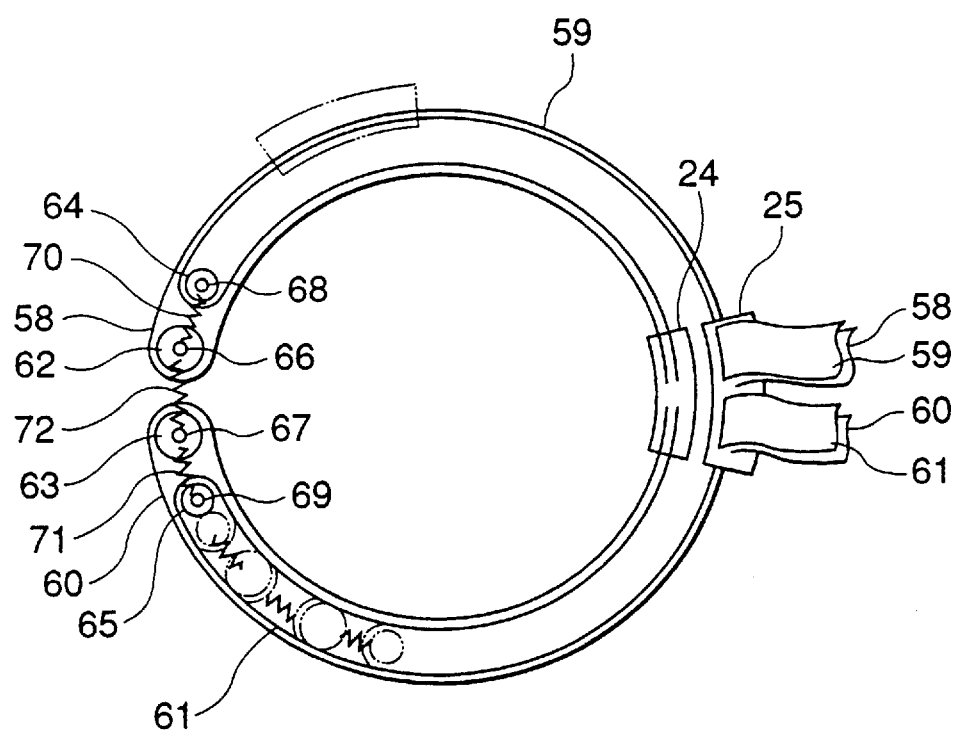
FIG. 13 is a front view of a joint of an industrial robot according to a fourth embodiment of the present invention.
Figure 14:
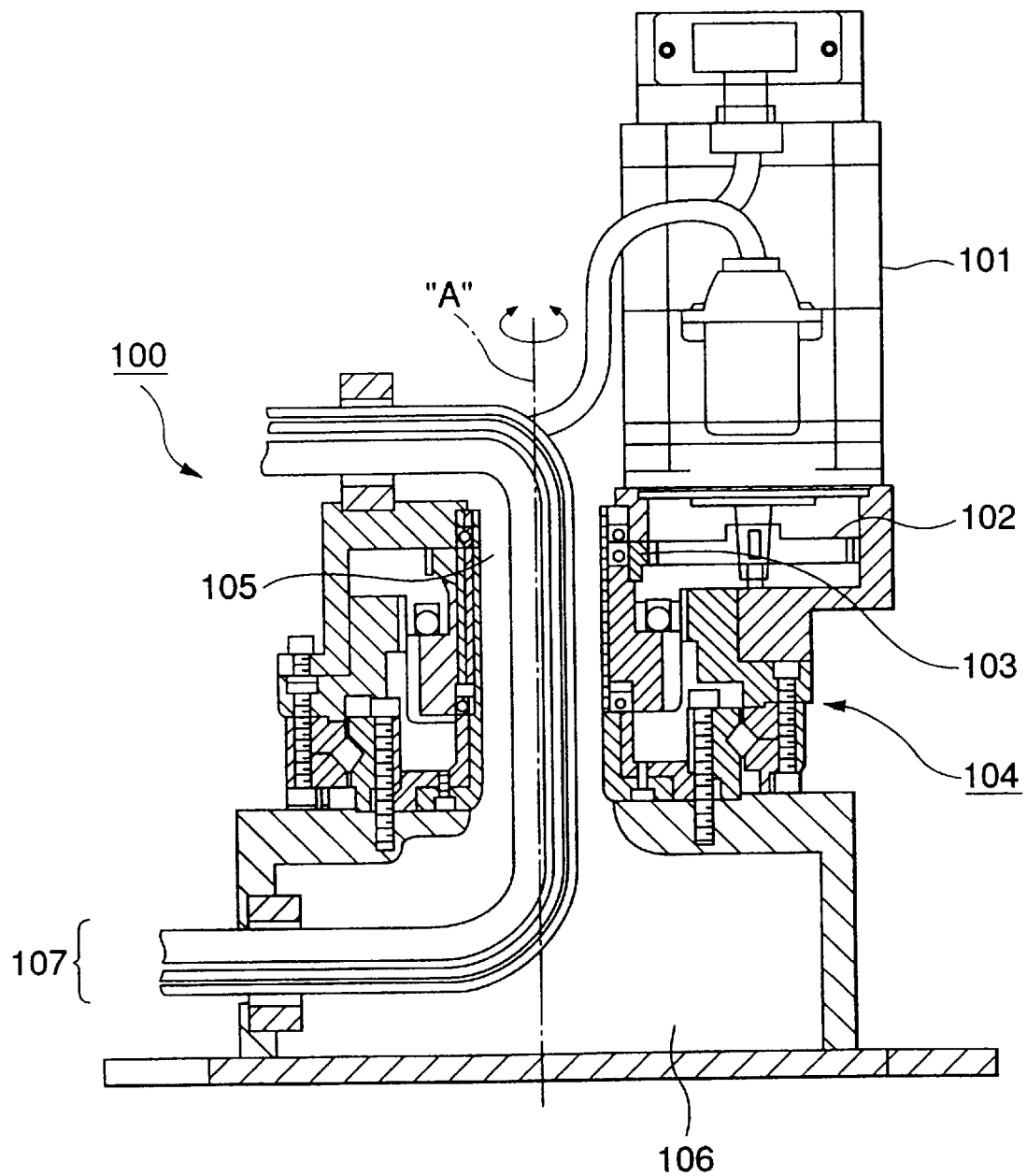
FIG. 14 is a sectional view of a joint of a conventional industrial robot according to a first example.
Figure 15:
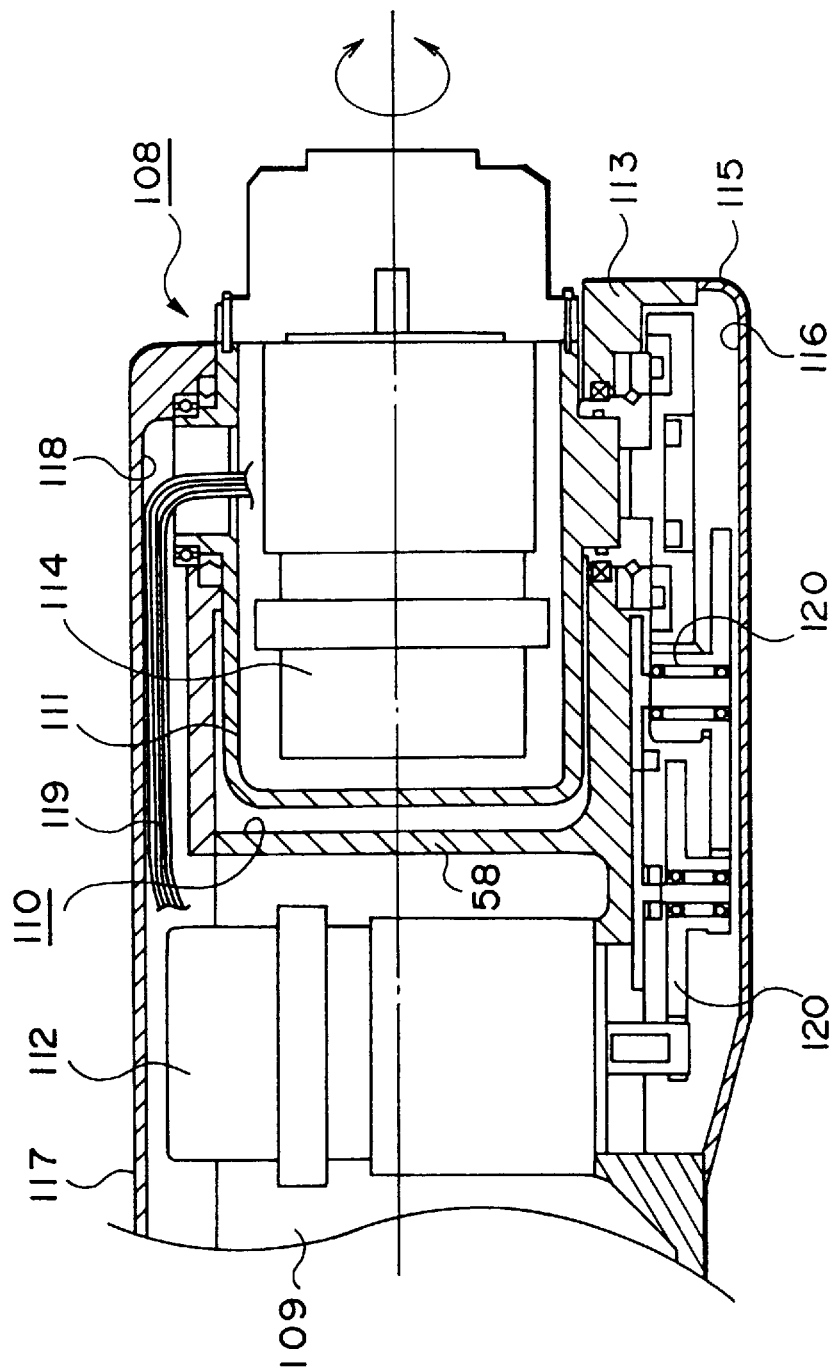
FIG. 15 is a sectional view of a joint of a conventional industrial robot according to a second example.
Figure 16:
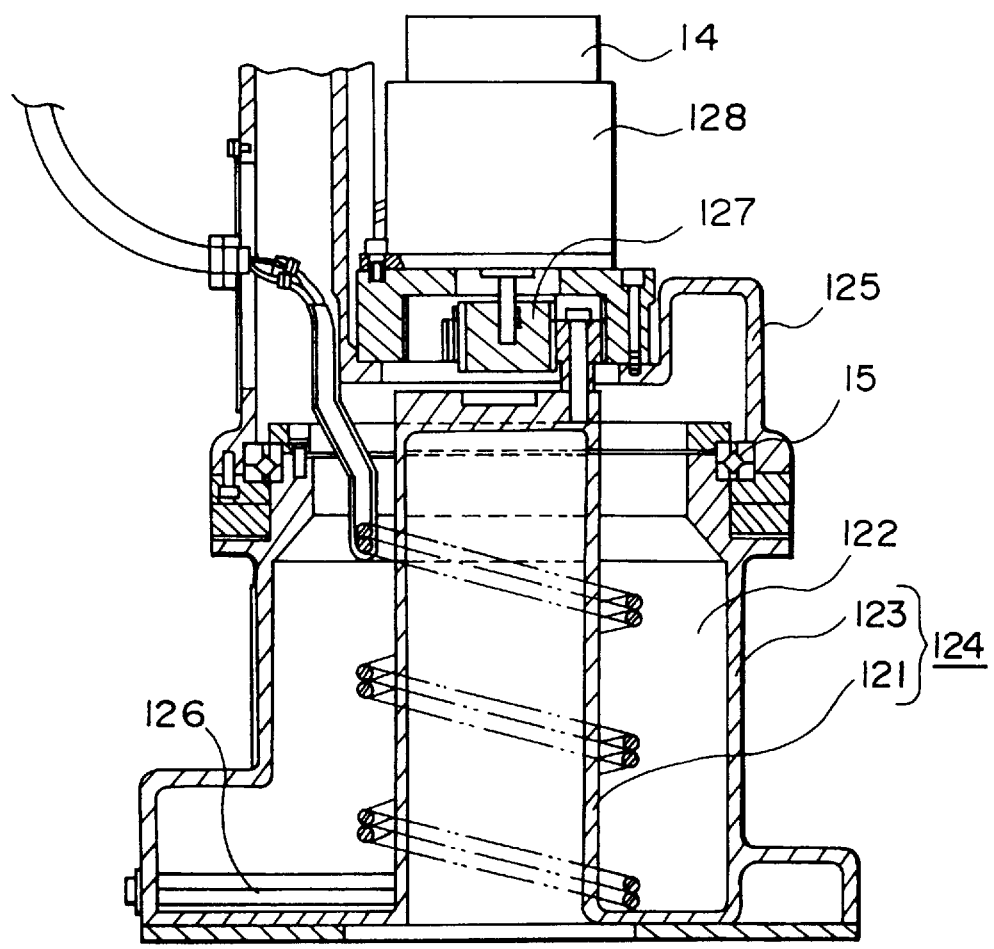
FIG. 16 is a sectional view of a joint of a conventional industrial robot according to a third example.

FIG. 13 is a front view showing a joint according to a fourth embodiment of the present invention.

In the fourth embodiment, the following elements are added relative to the third embodiment. Specifically, flexible card cables 58 and 60 including power lines 14, flexible card cables 60 and 61 including signal lines 15, cable tension rollers 62 to 65 which roll along with the movement of bent portions of the U-shaped card cables 58 to 61 following the movement of the cable fixing member 25 caused by the pivotal motion of the second arm 7, cable tension roller shafts 66 to 69 passing through the cores of the cable tension rollers 62 to 65, respectively, spring 70 for coupling between the roller shaft 66 and the roller shaft 68 and pulling the bent portions of the U-shaped card cables 58 and 60, and spring 71 for coupling between the roller shaft 67 and the roller shaft 69 and pulling the bent portions of the U-shaped card cables 60 and 61, are added.

The card cables 58 and 60 are similar to the card cables 51 and 52 in the third embodiment. The cable tension rollers 62 and 63 are similar to the cable tension rollers 52 and 54 in the third embodiment. The cable tension roller shafts 66 and 67 are similar to cable tension roller shafts 56 and 57 in the third embodiment, and the cable coupling spring 72 is similar to the cable coupling spring 53 of the third embodiment.

The card cable 59 is bent back inside the card cable 58 and fixed to the cable fixing members 24 and 25 like the card cable 58. Similarly, the card cable 61 is bent back inside the card cable 60 and fixed to the cable fixing members 24 and 25 like the card cable 60.

In the fourth embodiment, as in the third embodiment, since the inner-side ends of the card cables 58 and 60 (which are pressed against the inner-wall outer periphery of the ring-shaped space 32 due to the component, in the diametrical direction of the ring-shaped space 32, of the tensile force applied to the cable tension rollers 62 and 63 by the constant tensile force spring 72 via the cable tension roller shafts 66 and 67) are fixed to the cable fixing member 24, no relative motion is generated, regardless of the operation of the second arm 7, between the inner-wall outer periphery of the ring-shaped space and the inner sides of the card cables 58 and 60.

Thus, any friction which is generated between the inner-wall outer periphery of the ring-shaped space 32 and the inner sides of the card cables 58 and 60 does not prevent the movement of the card cables 58 and 60.

In the structured robot joint, when the second arm 7 is aligned with the first arm 6, the cable fixing member 25 is located at a position identified by the solid line as shown in FIG. 13.

From this state, when the second arm 7 swivels by 110° in the counterclockwise direction by means of the drive unit 11, the cable fixing member 25 fixed to the second arm 7 moves to a position identified by the two-dot chain line.

At this time, the card cables 60 and 61 are pulled by the second arm 7 so as to move, along with the rollers 63 and 65 and the roller shafts 67 and 69, by 55° from the bent positions identified by solid lines in the counterclockwise direction to reach positions identified by the two-dot chain lines.

On the other hand, since the card cables 58 and 60 are pulled by the card cables 60 and 61 via the rollers 63 and 65, the spring 70, 71, and 72 and the rollers 62 and 64, the card cables 58 and 60 move by 55° in the counterclockwise direction from the bent positions identified by solid lines to the positions identified by the two-dot chain lines without generating corrugation due to loosening between the cable fixing member 24 and the rollers 62 to 65 or between the rollers 62 to 65 and the cable fixing member 25. Thus, the card cables can follow the movement of the cable fixing member 25 due to the pivotal motion of the second arm 7 without losing the U-shapes formed by the cable fixing member 24, the cable tension rollers 62 to 65 and the cable fixing member 25.

Specifically, the card cables 58 and 60 follow the movement of the card cables 60 and 61 via the cable tension rollers 62 to 65, the cable tension roller shafts 66 to 69, and the springs 70, 71, and 72.

Similarly, the card cables 60 and 61 follow the movement of the card cables 58 and 60 via the cable tension rollers 62 to 65, the cable tension roller shafts 66 to 69, and the springs 70, 71, and 72. With this arrangement, the card cables 58 to 61 follow the movement of the second arm 7.

At this time, as in modes 2 and 3, the distance of movement of each of the cable tension rollers 62 to 65 is half that of the cable fixing member 25 caused by the pivotal motion of the second arm 7.

According to the foregoing structure, by combining aspects of the second and third embodiments, that is, by overlapping the card cables 58 and 60 and the card cables 60 and 61 as described in the second embodiment, a larger number of power lines 14 and the signal lines 15 can be arranged in the groove 32.

Further, since the signal line 15 and the power line 14 are arranged in separate card cables, a width of the card cable can be reduced, and thus, a thickness of the groove 32 of the wiring chamber 30 is reduced to render the wiring chamber 30 thinner, thereby leading to the reduction in size of the joint 10.

The present invention has the foregoing structure and thus achieves the following effects.

An industrial robot according to the present invention comprises a first member; a second member which swivels relative to the first member; a third member which swivels relative to the second member; a first drive unit provided at the first member for swiveling the second member; a second drive unit provided at the second member for swiveling the third member; a cable passing inside of the first and second members for feeding power or a signal to the second drive unit; a first fixing member for fixing a portion of the cable to an end portion of the first or second member; a second fixing member for fixing another portion of the cable to an end portion of the first or second member; and a bent cable provided between the first and second fixing members so as to be bent in a U-shape, the bent cable provided at either one of the first and second members, the bent cable arranged at a rim portion of an output shaft of the first drive unit with a bent portion thereof as one end thereof and with fixed portions to the first and second fixing members as other ends thereof, and an elastic member for applying with a tensile force in a direction opposite to said fixing members to one end of said bent portion.

Accordingly, one-way assembly from the side where the bent cable is arranged, is made possible so that the assembly process of the joint is improved to easily achieve the automated assembly.

Further, since the bent cable is arranged at the rim portion of the output shaft of the first drive unit, the joint can be reduced in size in the axial direction.

Further, since the bent cable is not wound tight or loose due to the movement of the second arm so that the diameter of the turn of the cable is constant, the space for accommodating the bent cable is sufficient as long as the bent cable can be accommodated so that the space for accommodating the bent cable can be reduced in size.

Further, since the bent portion of the bent cable moves on the cable, the portions where the bending stress is concentrated are dispersed. Accordingly, the accumulated stress due to the bending is reduced so that the life of the bent cable can be prolonged.

Since the bent cable is not subjected to torsion, the life can be prolonged as compared with the case where torsion is applied.

Further, according to another aspect of the present invention, one end of the bent portion of the bent cable is fixed by the elastic member, and the tensile force is applied in the direction opposite to the fixing members. Thus, the pivotal motion of the second arm can be followed without generating corrugations due to loosening when the second arm swivels in the clockwise or counterclockwise direction.

Further, the moving range of the bent portion is half the operation angle of the second arm so that the extension/retraction range of the elastic member can be reduced. Accordingly, the elastic member can be made small, and thus, the area for accommodating the elastic member can be also made small so as to reduce the size of the joint.

Further, according to another aspect of the present invention, the elastic member is in the form of a constant tensile force spring so that the tensile force applied to the bent cable is held constant regardless of the position of the second arm, and thus, the ability to follow is stabilized.

According to another aspect of the present invention, a cable tension roller is rotatably provided at the bent portion, and the tensile force is applied to the bent portion in the direction via the cable tension roller. Accordingly, the cable tension roller rolls on the surface in synchronism with the movement of the bent portion of the bent cable so that the abrasion of the inner film of the bent portion can be prevented.

Further, according to another aspect of the present invention, the bent cable includes a power line and a signal line, and the power line and the signal line are separately arranged. Accordingly, the influence of noises from each other can be reduced.

According to another aspect of the present invention, the bent cable is a flexible card cable. Thus, bending is easily achieved.

According to another aspect of the present invention, the flexible card cables are separately arranged. Thus, the width of the card cable can be reduced so that the space for accommodating the card cable can be made small.

Further, by overlapping the card cables twofold, threefold or more, the number of cables and thus the number of circuits can be increased.

According to another aspect of the present invention, low-friction members are provided at an inner periphery of an outer wall forming the ring-shaped groove. Thus, even when the bent cable follows the pivotal motion of the second arm and swells toward the outer side of the ring-shaped ring, the bent cable is not caught in position due to friction with the outer-wall inner periphery of the groove.

According to another aspect of the present invention, the bent cable includes a first bent cable and a second bent cable, either one of the first and second members is formed with a ring-shaped groove for receiving therein the first and second bent cables, the first bent cable is arranged at one side of the ring-shaped groove and the second bent cable is arranged at the other side of the ring-shaped groove, and the bent portions of the first and second bent cables are connected by means of an elastic member. Thus, the elastic member can be made small. Further, since the corresponding space can be used as the operation area for the bent cable, effective use of the space can be achieved.

Further, the groove can be of a simple ring shape and the number of parts can be reduced so that assembly and maintenance can be improved.

What is claimed is:

1. An industrial robot comprising:

a first member;

a second member which swivels relative to said first member;

a third member which swivels relative to said second member;

a first drive unit provided at said first member for swiveling said second member;

a second drive unit provided at said second member for swiveling said third member;

a cable passing inside of said first and second members for feeding power or a signal to said second drive unit;

a first fixing member for fixing a portion of said cable to an end portion of said first or second member;

a second fixing member for fixing another portion of said cable to an end portion of said first or second member;

wherein said cable has a bent portion formed into a U-shape between said first fixing member and said second fixing member, said cable arranged so that a length of the cable defined between said bent portion and said first fixing member extends in a direction away from said bent portion, and a length of the cable defined between said bent portion and said second fixing member extends in a direction away from said bent portion; and an elastic member for applying a tensile force in a direction opposite to said fixing members to one end of said bent portion.

2. The industrial robot according to claim 1, wherein said elastic member is a constant tensile force spring.

3. The industrial robot according to claim 1, wherein a cable tension roller is rotatably provided at said bent portion, and wherein said tensile force is applied to said bent portion in said direction via said cable tension roller.

4. The industrial robot according to claim 1, wherein said bent cable includes a power line and a signal line, and wherein said power line and said signal line are separate.

5. The industrial robot according to claim 1, wherein said bent cable comprises at least one flexible card cable.

6. The industrial robot according to claim 5, wherein said bent cable includes plural, separate flexible card cables.

7. The industrial robot according to claim 5, wherein a plurality of said flexible card cables are separately arranged, and are connected together by means of an additional elastic member.

8. The industrial robot according to claim 1, wherein one of said first and second members is formed with a ring-shaped groove for receiving therein said bent cable, and wherein low-friction members are provided at an inner periphery of an outer wall forming said ring-shaped groove.

9. The industrial robot according to claim 1, wherein said bent cable includes a first bent cable and a second bent cable, wherein one of said first and second members is formed with a ring-shaped groove for receiving therein said first and second bent cables, wherein said first bent cable is arranged at one side of said ring-shaped groove and said second bent cable is arranged at the other side of said ring-shaped groove, and wherein said bent portions of the first and second bent cables are connected by means of an elastic member.

10. The industrial robot according to claim 7, wherein one of said flexible card cables carries signal lines, and another of said flexible card cables carries at least one power line.

11. The industrial robot according to claim 7, wherein said plural flexible card cables are nested such that at least one flexible card cable is positioned substantially within another of said flexible card cables.

12. The industrial robot according to claim 1, wherein the bent portion of said cable is arranged near an axial end portion of an output shaft of said first drive unit.

* * * * *